Sept. 13, 1932.  W. A. GIBSON  1,876,911
AIR SEPARATOR
Filed Oct. 23, 1930    2 Sheets-Sheet 2

Inventor.
William A. Gibson
by Heard Smith & Tennant.
Attys.

Patented Sept. 13, 1932

1,876,911

UNITED STATES PATENT OFFICE

WILLIAM A. GIBSON, OF ALLENTOWN, PENNSYLVANIA, ASSIGNOR TO BRADLEY PULVERIZER COMPANY, OF ALLENTOWN, PENNSYLVANIA, A CORPORATION OF MASSACHUSETTS

AIR SEPARATOR

Application filed October 23, 1930. Serial No. 490,619.

This invention relates to improvements in air separators by providing means for increasing the whirling action of the ascending air currents which separate the fine material from the coarse operable to prolong the period of suspension of the material descending through the air current and thereby increase the relative proportion of fines separated from the coarser material.

A further object of the invention is to provide rotating means for producing such whirling action which will act also to disintegrate, by impact, coarser particles of material, thereby further increasing the relative proportion of fines.

More specifically the invention relates to improvements in air separators of the type which comprises an outer closed casing having means, such as a hopper, to collect and discharge the fine material, and an inner casing spaced apart from the outer casing having means, such as a hopper, to collect and deliver the coarse material or tailings, with means for creating a continuous current of air upwardly through the chamber of the inner casing and downwardly through the space between the inner and outer casings, with means for delivering the material centrifugally into the upper portion of the inner casing.

In the operation of air separators, and particularly of the type above described, the ascending currents of air in the inner chamber carry the fine material upwardly, thence outwardly into the space between the inner and outer casings, and by reason of the increased area of the passages between the inner and outer sections the velocity of the air is slowed down sufficiently, so that it will drop its burden of fine material into the hopper of the outer casing from which it may be delivered in any suitable manner. The coarser material, which is too heavy to be carried upwardly by the ascending current of air, drops into the lower portion or hopper of the inner casing and is removed therefrom as tailings.

While air separators may act very efficiently with certain types of materials, such as raw limestone, etc., its efficiency of separation is much less upon other materials, such as ground cement clinker, probably because of the fact that the fine particles of the material adhere to the coarser particles through some sort of magnetic attraction, and it is the purpose of the present invention to stir up or break away such adhering particles, so that they will free themselves from the coarser particles, and also, to a certain extent, to disintegrate some of the coarser particles, by impact, produced by rotating members, or by mutual impact of members driven by the rotating members against other coarser members within the chamber of the inner casing.

A further object of the invention is to provide means for directing the air from the space between the inner and outer casings into the chamber of the inner casing in a substantially tangential direction and thereby to produce a whirling action of the material within the chamber of said casing, such whirling action preferably being supplemented by rotating means within the chamber below the zone of centrifugal distribution of the material therein.

These and other objects and features of the invention will more fully appear from the following description and the accompanying drawings, and will be particularly pointed out in the claims.

Figure 3:
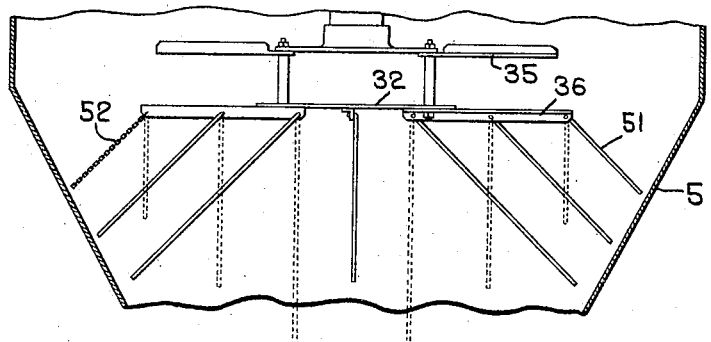
Figure 4:
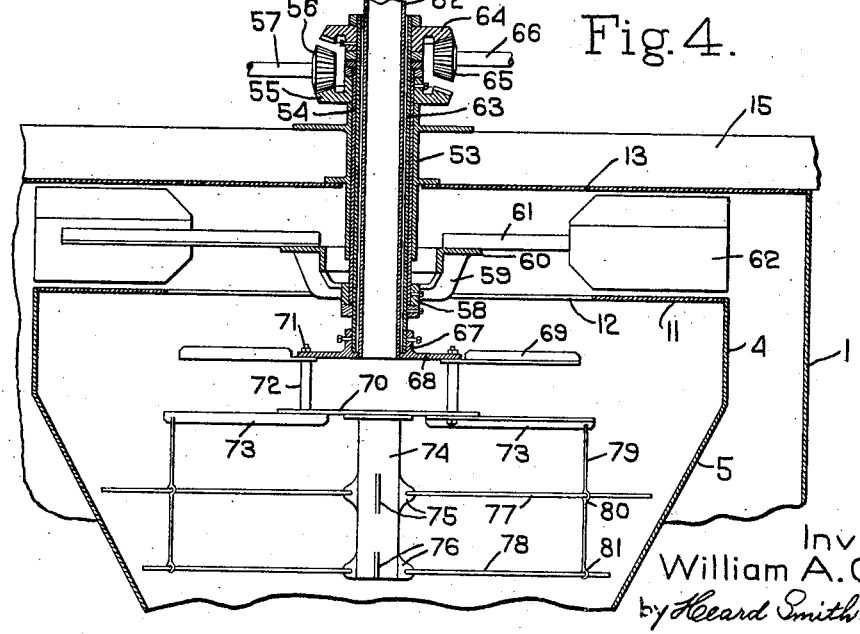

Fig. 3 is a fragmentary detail view of a modified construction in which bars, cables, or chains, flexibly connected to and depending from the distributor plate, serve to create a whirling motion of the air within the chamber of the inner casing below the distributor; and, Fig. 4 is a fragmentary detail view, mainly in vertical section, of a modified form of the invention comprising mechanism for selectively rotating the fans and the distributor, either in the same direction and at the same or different speeds, or in opposite directions, and also illustrating a different mechanism supported from the distributor plate for creating a whirling action of the air in the chamber of the inner casing.

Figure 1:
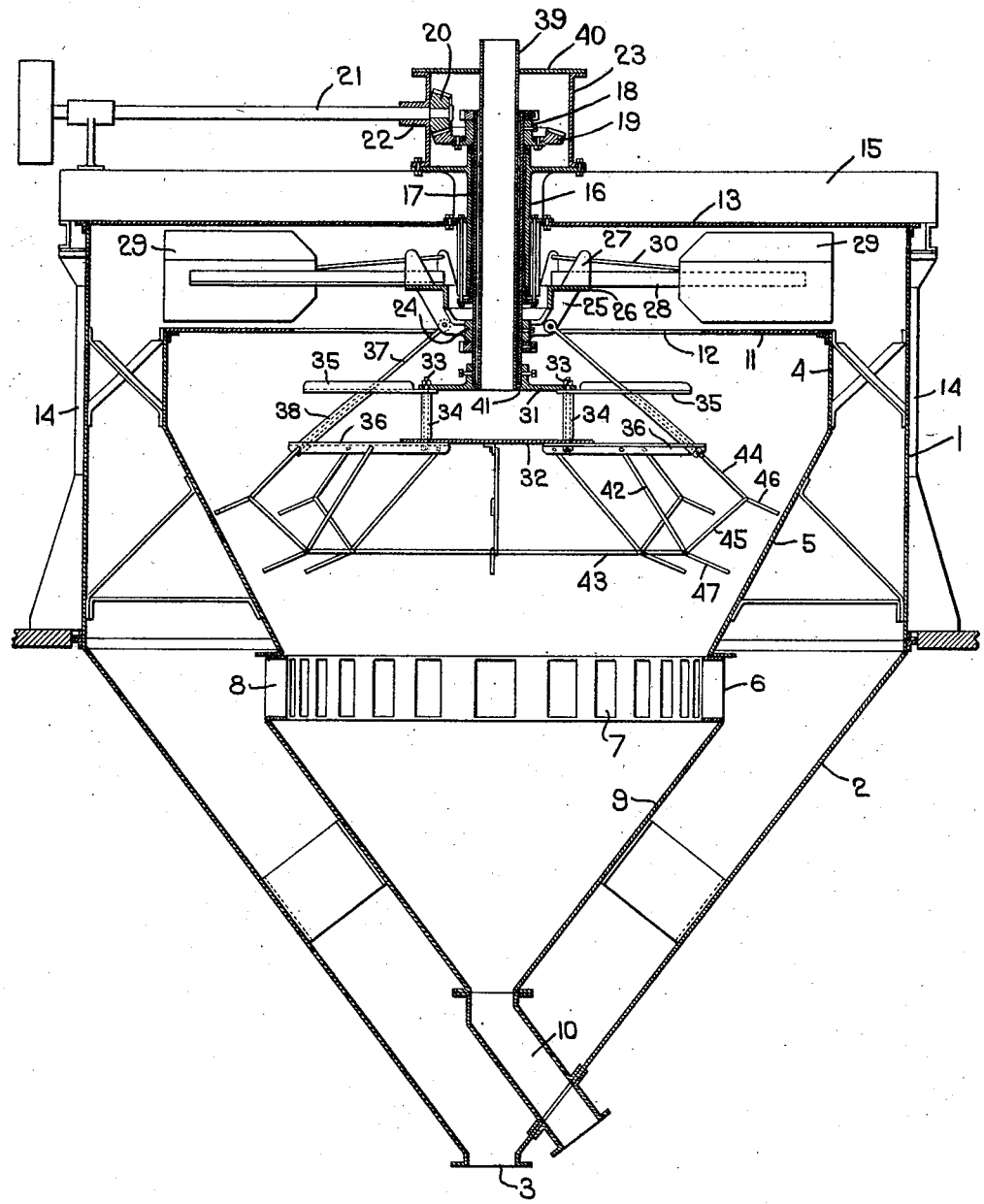
Fig. 1 is a view, mainly in central vertical section, of an air separator containing a preferred embodiment of the invention.

The air separator illustrated in Fig. 1 of the drawings comprises an outer closed casing 1, preferably of cylindrical form, having a conical-shaped bottom 2 provided with an outlet 3 for the fine materials which are separated from the coarse materials. An inner casing, which is supported within the outer casing and preferably concentrically thereto, comprises an upper cylindrical portion 4, a downwardly extending conical portion 5, and preferably a cylindrical portion 6 connected to the lower end of the conical portion 5 and provided with a series of ports 7, the walls of which are provided with vanes or flanges 8 extending inwardly at such angle to the radius of the inner casing as to direct the air in a substantially tangential direction toward the inner face of the wall of the inner casing, and thereby to create a whirling action within the casing. The inner casing is also provided with a lower conical portion or hopper 9 having at its lower end a conduit 10 through which the coarser material or tailings is delivered.

The upper end of the inner casing is provided with an annular top 11 having a central circular opening 12 and spaced apart from the upper wall 13 of the outer casing. The outer casing is secured to suitable supporting members or posts 14 which may be mounted upon the girders of the floor (not shown). A cross girder 15, or spider, is mounted upon the upper ends of the posts 14 and carries the super-structure including the driving mechanism. In the construction shown a long bearing member 16 is mounted upon or formed integral with the girder or spider and extends axially downwardly through the top of the outer casing.

A hollow shaft 17 is rotatably mounted within the bearing 16, suitable bushings desirably being provided at the upper and lower portions of the bearing. The upper end of the hollow shaft has secured to it the hub 18 of a ring gear 19 adapted to be engaged by a pinion 20 mounted upon the end of a driving shaft 21 which is rotatably mounted in a suitable bearing 22 carried by a preferably cylindrical casing 23 which is mounted upon the girder 15.

The hub 18 of the ring gear desirably is supported upon anti-friction bearings upon the upper end of the cylindrical bearing member 16. A hub 24, which is secured to the lower end portion of the hollow shaft, in any suitable manner, is provided with upwardly extending arms 25 having at their upper ends a preferably integral annular ring 26 presenting a flat surface, with upwardly extending pairs of ears 27. Arms 28, carrying suitable fan blades 29, are mounted upon the flat upper surface of the ring 26 and extend radially outwardly therefrom, and truss rods 30, which are connected at one end to the upper ends of the ears 27 and at their opposite ends to the remote ends of the arms 28, serve rigidly to support the fans. The fans are rotatable within the space between the tops of the inner and outer casings and serve to draw the air upwardly through the inner casing to force it outwardly and thence downwardly through the space between the inner and outer casings, the air returning to the inner casing preferably through the ports 7 or through any other space which may be provided for such purpose between the outer and inner casings.

The lower end of the hollow shaft 17 has secured to it the hub of a preferably annular support 31 and a circular distributor plate 32 is carried by the support 31 by bolts 33 and spaced apart therefrom by suitable spacing sleeves 34 surrounding said bolts. Preferably bars, such as angle bars 35, are secured to the under face of the support 31 and project radially therefrom, and other bars, such as angle bars 36, are secured to the lower face of the distributor plate and project radially therefrom. These bars are utilized to support the stirring devices which, during the rotation of the distributor, produce a whirling movement of the upwardly ascending air current in the chamber of the inner casing, and the lower bars 36 also serve to re-enforce and stiffen the distributor plate. Brace rods 37, connected at their lower ends to the outer ends of the bars 36, extend upwardly and inwardly and are connected at their upper ends to the arms 25 of the hub 24. Spacing sleeves 38 are interposed between the bars 36 and 35 to maintain them in proper parallelism and also to aid in supporting the outer portions of the bars and the mechanism suspended therefrom.

A hollow feed tube 39, which is supported at its upper end upon the top 40 of the casing 23, extends downwardly through the hollow shaft 17 and is engaged at its lower end by an inwardly extending flange 41 upon the supporting member 31 for the distributor plate, thereby preventing vibration of the lower end of the feed tube.

The material, which is introduced in any suitable manner into the upper portion of the feed tube, passes downwardly therethrough to the distributor plate 32 from which it is thrown by centrifugal force outwardly into the path of the ascending air current in the chamber of the inner casing. The ascending air current is produced by the suction of the fan blades 29 which also forces the air outwardly, thence downwardly through the space between the inner and outer casings.

As the velocity of the downwardly descending current decreases, because of the downwardly progressively enlarged cross sectional area space between the inner and outer casings, the fine material is dropped from the air current into the hopper portion 2 of the outer casing from which it is removed through the outlet 3.

The construction above described is similar to that of usual air separators.

The present invention comprises the provision of means for imparting to the ascending current of air within the inner casing a whirling movement adapted to prolong the period of suspension of the particles of material which are projected outwardly by the rotating distributor and descend by gravity against the force of the ascending current without producing so great a velocity of centrifugal action as would defeat the purpose of the present invention.

Any suitable means may be provided, such as rods, cables, chains, or the like, with suitable means for rotating the same in the portion of the chamber beneath the distributor for the material, certain or all of such devices preferably being so connected to a rotating member as to be deflected outwardly by centrifugal force at an angle to the axis of the rotating member.

In the particular construction illustrated in Fig. 1 series of rods 42 are pivoted, or otherwise flexibly connected at their upper ends to the bars 36 which extend outwardly from the distributor plate 32, the lower ends of adjacent members being connected together by suitable means, such as connecting members, or a continuous ring 43. Other members, such as rods or chains 44 and 45, are connected respectively to the bars 36 and the ring 43 preferably at the junctions of the members 42 with said ring, the members 44 and 45 being flexibly connected together at their adjacent ends, or the members 44 and 45 may be in the form of a continuous rod or chain. Desirably centrifugally movable members 46 are flexibly connected to the junction of the members 44 and 45, and other members 47 may, if desired, be flexibly connected to the junctions of the members 42 of the ring 43. The members 46 and/or 47 may be rods, chains, or other suitable means for imparting the desired whirling action to the ascending air current and when thrown outwardly by centrifugal force preferably extend into proximity to the surface of the inner casing.

By reason of this construction the rotation of the distributing disk 32 will impart to the members 44, 45, 46, and 47, a centrifugal movement which will tend to throw them outwardly into the positions illustrated in Fig. 1, thereby presenting a basket-like construction which rotates with the distributing disk within the chamber of the inner casing below the zone of centrifugal distribution of the material to be separated. The rotation of the various members of this basket-like construction produces a whirling movement of the air within the separating chamber which serves to prolong the period of suspension of the descending particles within the chamber. Furthermore, these rotating members will impinge upon a large number of the coarser particles during their descent through the ascending air current, and their impact upon such coarser particles will not only dislodge fines which have adhered to them, but in many instances will also break up the particles themselves or project them against other coarse particles with sufficient force to dislodge such fines as are accumulated upon them, and also in some instances further to disintegrate the particles themselves.

By reason of this construction, therefore, the relative proportion of the fines within the chamber of the inner casing is increased and consequently the ascending current of air will carry them over into the space between the inner and outer casings and into the hopper of the outer casing. By reason of the present invention, therefore, the efficiency of the separator will be very greatly increased.

Where tangentially arranged ports are provided for conducting the air from the space between the outer casing and the inner casing into the chamber of the inner casing, the whirling action within the inner casing will be considerably increased without, however, producing such vigorous whirling as to defeat the purpose of the present invention.

Figure 2:
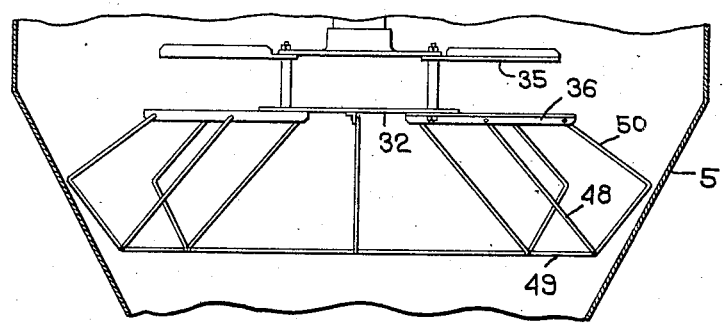
Fig. 2 is a fragmentary detail view showing a modified form of mechanism supported by the rotatable distributing member operable to cause a whirling movement of the air within the chamber of the inner casing and to disintegrate the coarser particles of the material descending through the air current in said casing.

Another form of device for producing a whirling action of the ascending air current within the chamber of the inner casing is illustrated in Fig. 2 which, like that illustrated in Fig. 1, comprises a basket-like construction consisting of a plurality of rods 48 extending downwardly and outwardly from the bars 36 of the distributor plate 32 connected at their lower ends to a ring 49. In this construction other V-shaped rods 50 are connected at their respective ends to the ends of the bars 36 and to the ring 39 and are so disposed that the angular portions of the rods lie in close proximity to the inner surface of the cone-shaped portion 5 of the inner casing.

In Fig. 3 a modified construction is shown in which a series of members are flexibly connected to the bars 36 at different radial distances from the vertical axis of the distributor plate 32 and are of such different lengths that in operation the ends of such members will be carried out by centrifugal force into proximity to the inner surface of the conical-shaped portion 5 of the inner casing. In this construction the depending members may be in the form of rods 51, cables or chains 52, any or all of which may be employed in the same construction.

In Fig. 4 a modified form of the invention is illustrated in which the distributor and the mechanism for creating a whirling action within the chamber of the inner casing are rotated in the opposite direction to the direction of rotation of the fan. In this construction the outer casing 1 and the inner casing, comprising the cylindrical portions 4 and 5, etc., and the supporting girder 15, may be the same or similar to that disclosed in Fig. 1. The means for supporting and rotating the fan and the distributor plate together with the stirring devices depending from the distributor plate differ, however, in that suitable means are provided for causing the fan to rotate in one direction and the distributor plate and depending devices to rotate in the opposite direction. In this construction the girder 15 supports a long bearing member 53 in which a tubular shaft 54 is rotatably mounted with suitable bushings (not shown) therebetween. The tubular shaft 54 has secured to its upper end a bevel gear 55 which is engaged by a pinion 56 upon a driving shaft 57. The lower end of the shaft 54 has secured to it a hub 58 of a spider, the arms 59 of which extend upwardly and are preferably formed integral with an annular support 60 similar to the support 26 illustrated in Fig. 1, and arms 61 secured to the support 60 extend radially outwardly therefrom and are provided with fan blades 62 which rotate in the space between the top 11 of the inner casing and the top 13 of the outer casing.

An inner hollow shaft 63 is rotatably mounted within the shaft 54 with suitable bushings (not shown) therebetween and has secured to its upper end a bevel gear 64 which engages a bevel pinion 65 upon a driving shaft 66. The hub of the gear 64 desirably is carried by suitable bearings resting upon the hub of the lower bevel gear 65. The lower end of the inner shaft 63 has secured to it a hub 67 of an annular support 68 which preferably is provided with outwardly extending radial bars 69 as illustrated in Fig. 1. The distributor plate 70 is carried by the support 68 by bolts 71 and spaced apart therefrom by sleeves 72 surrounding the bolts 71. The distributor plate 70 also desirably is provided with radially extending bars 73.

In this construction a preferably tubular member 74, forming in effect an extension of the inner shaft 63, is carried by the distributor plate 70 and extends downwardly therefrom. This tubular member desirably is provided with radially extending integral bosses 75 and 76 to which radially extending rods 77 and 78 are pivotally connected. The rods 77 and 78 desirably are maintained in substantial parallelism by suitable connecting members, such as rods or chains 79, flexibly connected at their upper ends to the end portions of the bars 73 and by suitable other flexible connections 80 and 81 to the bars 77 and 78 respectively.

The bars 77 and 78 desirably are of such length that their ends terminate in proximity to the inner surface of the conical portion 5 of the inner casing. A hollow feed pipe 82, which extends downwardly through the inner hollow shaft, is supported in any suitable manner from the housing for the gears, as illustrated in Fig. 1, and at its lower end is rotatably engaged by an inwardly extending flange upon the support 67 as described in respect to Fig. 1. The material to be separated is fed through the feed pipe 82 upon the distributor plate 70 and is projected by centrifugal force from the distributor plate toward the wall of the inner casing and descends by gravity through the ascending air current, as heretofore described.

Inasmuch as the inner and outer hollow shafts are independently driven, the fan may be rotated in the same direction as the direction of rotation of the distributor plate either in synchronism therewith, or in any other timed relation thereto, which may be provided by conical driving pulleys mounted upon the shafts 57 and 66 as shown in the prior patent to Gibson and Needham No. 1,346,015, granted July 6, 1920, or the fan and the distributor plate may be rotated in opposite directions by suitable mechanism for reversing the direction of rotation of one of the driving shafts 57 or 66.

Where the ports for returning the air from the space between the inner and outer casings to the chamber of the inner casing are tangentially disposed and serve to cause a whirling action of the air within the chamber of the inner casing, reverse direction of rotation of the distributor disk and the stirring devices depending therefrom may be desirable to avoid too great centrifugal movement of the air within the inner casing.

It is obvious that any of the other forms of stirring devices, whether of basket-like construction shown in Figs. 1 and 2, or the flexibly-supported members shown in Fig. 3, or any other suitable form of stirring devices may be employed in the construction disclosed in Fig. 4 in place of the particular construction illustrated in Fig. 4.

It will, therefore, be understood that various modifications in form, construction and arrangement of parts may be made within the scope of the invention as defined by the claims, and that the invention may be employed in other forms of separators in which it may be embodied for the purpose of performing the functions herein described.

Having thus described the invention, what is claimed as new, and desired to be secured by Letters Patent, is:

1. An air separator comprising a closed outer casing having means for delivering the finished material, an inner casing spaced apart from said outer casing and having means for delivering the tailings, means for causing a continuous circulation of air upwardly through the chamber of the inner casing and downwardly through the space between the inner and outer casings, means for feeding the material axially into said inner casing, rotatable means for distributing said material centrifugally into the ascending air current, members flexibly suspended from said rotatable distributing means, and movable outwardly by centrifugal force operable to cause a whirling movement of the ascending current of air in the inner casing and to prolong the suspension of the descending material and to disintegrate coarser particles of material by impact.

2. An air separator comprising a closed outer casing having means for delivering the finished material, an inner casing spaced apart from said outer casing and having means for delivering the tailings, means for causing a continuous circulation of air upwardly through the chamber of the inner casing and downwardly through the space between the inner and outer casings, means for feeding the material axially into said inner casing, rotatable means for distributing said material centrifugally into the ascending air current, members of different lengths pivotally mounted upon said rotatable distributing means at different distances from the axis thereof and movable outwardly by centrifugal force into the path of the descending material operable to cause a whirling movement of the ascending current of air in the inner casing and thereby prolong the suspension of the descending material and to cause disintegration, by impact, of particles of the coarser material.

3. An air separator comprising a closed outer casing having means for delivering the finished material, an inner casing spaced apart from said outer casing and having means for delivering the tailings, means for causing a continuous circulation of air upwardly through the chamber of the inner casing and downwardly through the space between the inner and outer casings, means for feeding the material axially into said inner casing, rotatable means for distributing said material centrifugally into the ascending air current, rods pivotally mounted upon and depending from said rotatable distributing means, a ring connecting the lower ends of said rods, and flexible members connected at their upper and lower ends respectively to said distributing member and said ring adapted to be moved outwardly by centrifugal force into the path of the descending material and operable to cause a whirling movement of the ascending current of air in the inner casing and thereby prolong the suspension of the descending material and to cause disintegration, by impact, of particles of the coarser material.

4. An air separator comprising a closed outer casing having means for delivering the finished material, an inner casing spaced apart from said outer casing and having means for delivering the tailings, means for causing a continuous circulation of air upwardly through the chamber of the inner casing and downwardly through the space between the inner and outer casings, means for feeding the material axially into said inner casing, rotatable means for distributing said material centrifugally into the ascending air current, members suspended from said rotatable distributing means, means connecting the lower ends of adjacent suspended members, and V-shaped members connected respectively to said distributing members and to said connecting means and extending outwardly therefrom into proximity to the inner casing.

5. An air separator comprising a closed outer casing having means for delivering the finished material, an inner casing spaced apart from said outer casing and having means for delivering the tailings, means for causing a continuous circulation of air upwardly through the chamber of the inner casing and downwardly through the space between the inner and outer casings, means for feeding the material axially into said inner casing, rotatable means for distributing said material centrifugally into the ascending air current, members suspended from said rotatable distributing means, means connecting the lower ends of adjacent suspended members, flexible members connected respectively to said distributing members and to said connecting means adapted to be thrown outwardly by centrifugal force produced by the rotation of said distributing members, and other flexible members connected at one end centrally to the centrifugally operated flexible members adapted to be projected outwardly during the rotation of said distributing member.

6. An air separator comprising a closed outer casing having means for delivering the finished material, an inner casing spaced apart from said outer casing and having means for delivering the tailings, means for causing a continuous circulation of air upwardly through the chamber of the inner casing and downwardly through the space between the inner and outer casings, means for feeding the material axially into said inner casing, rotatable means for distributing said material centrifugally into the ascending air current, members flexibly suspended from said rotatable distributing means at different radial distances from the axis thereof, a ring flexibly connected to the lower ends of said suspended members, flexible members connected at their upper and lower ends respectively to said distributing members and to said ring and adapted to be thrown outwardly by centrifugal force produced by the rotation of said distributing members into the path of the descending material, and cables connected at one end to the central portion of the respective flexible members and other cables connected to said ring adapted to be projected outwardly during the rotation of the distributing member.

7. An air separator comprising a closed outer casing having means for delivering the finished material, an inner casing spaced apart from said outer casing having means for delivering the tailings and a centrally open top, spaced apart from that of the outer casing, a fan mounted on a central hollow shaft rotatable in the space between the tops of the inner and outer casings acting to create an upward current of air through the chamber of the inner casing, and a downward current of air between the side walls of said casings, means for feeding the material through said hollow shaft, a distributing plate carried by said shaft below the lower end thereof operable to project the material centrifugally into the ascending current of air in the inner casing, means in the lower portion of the side wall of the inner casing for directing a current of air substantially tangentially into the chamber of the inner casing to create a whirling motion of the air therein, and rotatable means in said inner chamber below said distributing plate operable to vary the whirling movement of the air in said chamber and to disintegrate, by impact, larger particles of the material descending through the whirling and ascending air current in said chamber, means flexibly suspended by and depending from said disintegrating plate at different distances from the axis thereof centrifugally movable by the rotation of said plate into proximity to the surface of the inner casing.

In testimony whereof, I have signed my name to this specification.

WILLIAM A. GIBSON.